(12) United States Patent
Müller

(10) Patent No.: US 9,409,600 B2
(45) Date of Patent: Aug. 9, 2016

(54) LANE ASSIST FOR A MOTOR VEHICLE AND METHOD FOR OPERATING A LANE ASSIST

(71) Applicant: Audi AG, Ingolstadt (DE)

(72) Inventor: Christoph Müller, Oberthulba (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/441,117

(22) PCT Filed: Oct. 30, 2013

(86) PCT No.: PCT/EP2013/003271
§ 371 (c)(1),
(2) Date: May 6, 2015

(87) PCT Pub. No.: WO2014/075766
PCT Pub. Date: May 22, 2014

(65) Prior Publication Data
US 2015/0284026 A1 Oct. 8, 2015

(30) Foreign Application Priority Data
Nov. 15, 2012 (DE) .................... 10 2012 022 387

(51) Int. Cl.
*B62D 15/00* (2006.01)
*B62D 15/02* (2006.01)
*B62D 5/00* (2006.01)

(52) U.S. Cl.
CPC .............. *B62D 15/025* (2013.01); *B62D 5/008* (2013.01)

(58) Field of Classification Search
USPC .................... 701/41, 23, 42, 36; 180/443, 444
See application file for complete search history.

(56) References Cited

U.S. PATENT DOCUMENTS

| | | | | | |
|---|---|---|---|---|---|
| 5,957,983 | A | * | 9/1999 | Tominaga | B62D 1/28 701/23 |
| 6,907,333 | B2 | * | 6/2005 | Iwazaki | B62D 15/0285 701/41 |
| 2001/0022249 | A1 | * | 9/2001 | Yoshida | B62D 5/0463 180/446 |
| 2005/0021204 | A1 | * | 1/2005 | Kudo | B62D 15/025 701/36 |
| 2005/0216161 | A1 | * | 9/2005 | Sakugawa | B60T 8/1755 701/70 |
| 2007/0095604 | A1 | * | 5/2007 | Suzumura | B62D 6/003 180/446 |
| 2010/0004823 | A1 | * | 1/2010 | Nakatsu | B62D 5/008 701/41 |
| 2010/0025144 | A1 | | 2/2010 | Huang et al. | |
| 2010/0256869 | A1 | | 10/2010 | Lich et al. | |
| 2011/0010094 | A1 | * | 1/2011 | Simon | B60W 30/16 701/301 |
| 2012/0123643 | A1 | * | 5/2012 | Limpibuntering | B62D 1/286 701/42 |
| 2012/0197496 | A1 | * | 8/2012 | Limpibunterng | B62D 1/286 701/42 |
| 2012/0203431 | A1 | * | 8/2012 | Kojo | B62D 15/025 701/41 |
| 2012/0283910 | A1 | * | 11/2012 | Lee | B62D 1/286 701/41 |
| 2013/0197758 | A1 | * | 8/2013 | Ueda | G05D 1/0088 701/41 |
| 2013/0274985 | A1 | * | 10/2013 | Lee | B60W 10/20 701/23 |
| 2013/0276688 | A1 | * | 10/2013 | Ekuni | B63H 25/04 114/162 |
| 2015/0151786 | A1 | * | 6/2015 | Fujii | B62D 6/008 701/42 |
| 2015/0248132 | A1 | * | 9/2015 | Lee | B62D 15/025 701/23 |
| 2015/0284026 | A1 | * | 10/2015 | Muller | B62D 15/025 701/41 |

FOREIGN PATENT DOCUMENTS

| | | |
|---|---|---|
| DE | 102007029909 | 1/2009 |
| DE | 102008008182 | 10/2009 |
| DE | 102010030646 | 12/2011 |
| DE | 102011082567 | 3/2013 |
| EP | 2 193 977 | 6/2010 |
| EP | 2 495 156 | 9/2012 |
| JP | 2008-189058 | 8/2008 |
| JP | 2011 031770 | 2/2011 |

* cited by examiner

*Primary Examiner* — Thomas Tarcza
*Assistant Examiner* — Richard Goldman
(74) *Attorney, Agent, or Firm* — Henry M. Feiereisen LLC.

(57) ABSTRACT

A lane assist system for a motor vehicle can be activated and deactivated and allows steering intervention on an axle by use of a superimposed steering system. The lane assist system, when activated, is designed to reduce the translation ratio of the superimposed steering system by a factor between 5 and 15.

8 Claims, 2 Drawing Sheets

LANE ASSIST FOR A MOTOR VEHICLE AND METHOD FOR OPERATING A LANE ASSIST

CROSS-REFERENCES TO RELATED APPLICATIONS

This application is the U.S. National Stage of International Application No. PCT/EP2013/003271, filed Oct. 30, 2013, which designated the United States and has been published as International Publication No. WO 2014/075766 and which claims the priority of German Patent Application, Serial No. 10 2012 022 387.0, filed Nov. 15, 2012, pursuant to 35 U.S.C. 119(a)-(d).

BACKGROUND OF THE INVENTION

The invention relates to a lane assist for a motor vehicle, which lane assist can be activated and deactivated and enables a steering intervention on an axle using a superimposed steering system.

Lane assists belong to the active steering systems of motor vehicles, in which a mechatronic system is provided to adjust the steering angle of the steered wheels.

Lane assists aid the driver by taking over the lateral guidance of the vehicle in the activated state. One or more optical sensors survey the surroundings of the vehicle, and the lane assist guides the vehicle within a certain driving envelope which has been established on the basis of the survey of the surroundings. The driving envelope is an area within a lane.

The operation of the Lane assist requires knowledge of the future travel path (trajectory) of the vehicle. The information about the future travel path would also be useful for other driver assist systems. To date, the future travel path is predicted on the basis of the current steering angle. At high speeds, e.g. on an expressway, the steering angle required for a great radius of curve is very small. In addition, the driver constantly carries out a shaky, jerky steering motion which is superimposed on the steering angle signal actually needed. These interferences, which play no significant part on the future trajectory, are in the same order of magnitude as the steering wheel angle signal required for determining the course of the trajectory. Even with high-resolution of the steering angle sensor, the result is still a very poor signal/noise ratio which does not allow prediction of a stable and precise trajectory.

SUMMARY OF THE INVENTION

The invention is therefore based on the object to provide a lane assist, which enables a more accurate determination of the current steering wheel angle.

This object is attained in accordance with the invention by a lane assist of the afore-mentioned type which is designed to reduce the translation ratio of the superimposed steering system in the activated state.

By changing the translation ratio, steering becomes more indirect, i.e., a greater steering wheel motion is required to effect the same change in the steering angle of the steered wheels compared to the deactivated state of the lane assist. Since the detected steering wheel angle, i.e. the wanted steering wheel angle signal, has been altered significantly by the changed translation ratio, any interference by the driver has no appreciable influence on the steering angle signal. Accordingly, the future trajectory can be accurately ascertained, when the lane assist is activated.

Activation of the lane assist is an essential prerequisite for accurate determination of the current steering wheel angle. Only when activated does the lane assist predominantly assume the lateral guidance, with the lane assist then guiding the vehicle within a certain area within the lane. There is virtually no need for the driver to intervene in the steering, when the lane assist is activated, such steering interventions merely represent a "fine adjustment" of the automatic guidance. In addition, a lane assist is activated only in the comfort zone, which is why a change of the translation ratio of the superimposed steering system is not critical in terms of driving performance, driving dynamics and stability limit.

Provision may be made for the lane assist according to the invention to reduce the translation ratio of the superimposed steering system, when activated, by a factor between 5 to 15. The steering ratio thus becomes more indirect by a considerable value or factor. Within the specified range for the translation ratio, it is preferred that the translation ratio, can be reduced in the activated state approximately by the factor 10. Accordingly, the value for the steering wheel angle signal is increased by tenfold, so that any interference generated by the driver can no longer influence this value in any significant way. The steering wheel angle signal can be detected in this way with higher quality.

The lane assist according to the invention can be designed to increase the translation ratio of the superimposed steering system in the deactivated state to an initial value. Preferably, the translation ratio is reset again to the original value which is effective, when the lane assist is deactivated. The translation ratio may correspond, for example in the deactivated state, to the factor 1, i.e. there is the presence of a "normal" ratio between steering wheel angle and wheel angle, which is established as part of the vehicle development. When the lane assist is activated, this normal value is reduced by a factor between 5 to 15, preferably 10; hence, a tenfold greater steering angle is, for example, required in comparison to the deactivated state of the lane assist in order to produce the same steering angle. When the lane assist is deactivated, the translation ratio is increased again to the initial value, e.g. the value 1.

According to the invention, it is particularly preferred when the steering wheel angle is made available as input variable for the prediction of the travel path of the motor vehicle. The information about the future travel path can be used for further driver assist systems.

In addition, the invention relates to a method for operating a lane assist for a motor vehicle, which can be activated and deactivated and enables a steering intervention on an axle by use of a superimposed steering system.

The method according to the invention is characterized in that the lane assist reduces in the activated state the ratio of the superimposed steering system.

The subclaims describe further configurations of the invention.

BRIEF DESCRIPTION OF THE DRAWING

Further advantages and details of the invention will be explained hereinafter with reference to an exemplary embodiment and the drawings. The drawings are schematic illustrations and show.

DETAILED DESCRIPTION OF PREFERRED EMBODIMENTS

Figure 1:
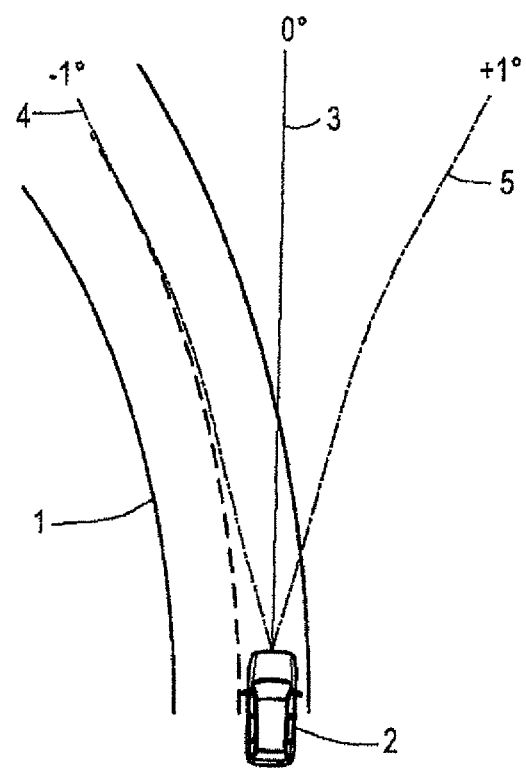
FIG. 1 a vehicle on a travel path and associated steering angle, with a lane assist being deactivated.

FIG. 1 is a schematic plan view and shows a travel path 1 for a vehicle 2 which travels along the right lane. A straight line 3 in longitudinal direction indicates the trajectory in the event the steering angle is 0°. In the situation shown in FIG. 1, the lane assist of the vehicle 2 is deactivated.

To the left of the straight line 3 is a trajectory 4 for the steering angle of −1°. To the right of the straight line 3 is a trajectory 5 for the steering angle 1°.

As can be seen in FIG. 1, even a relatively small change in the steering angle by 1° or 2° results in a significant inaccuracy in terms of the future travel path. In addition, the steering angle signal is superimposed by steering motions of the driver. As a result of these interferences, precise prediction of the trajectory is not possible.

Figure 2:
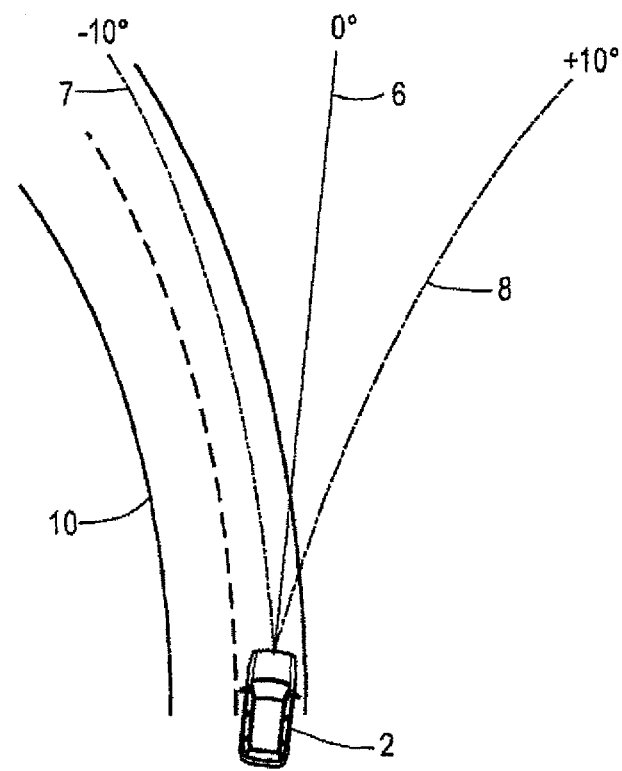
FIG. 2 the vehicle on the travel path and associated steering angle, when the lane assist according to the invention is activated.
Figure 3:
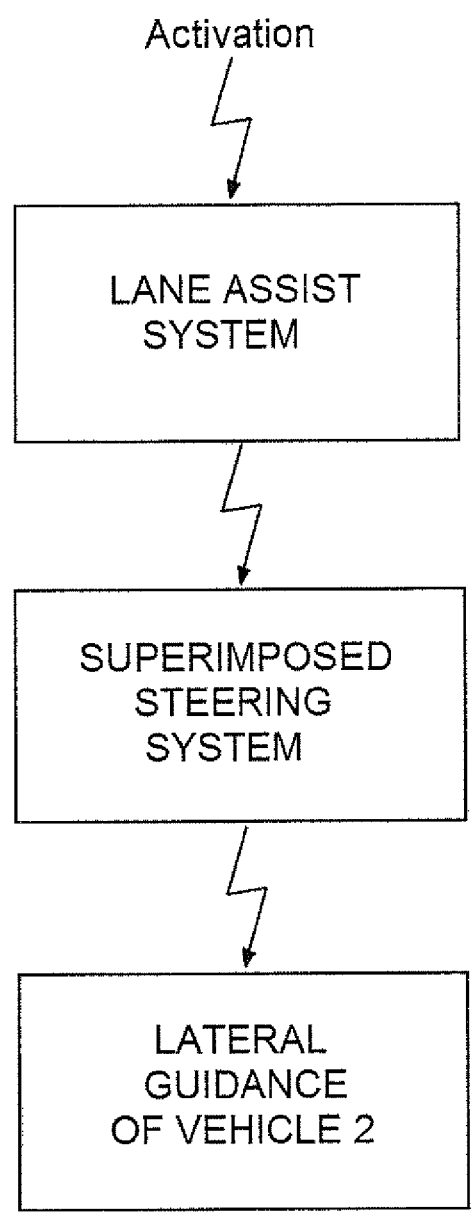
FIG. 3 a block diagram showing a relationship of the components of the lane assist system.

FIG. 2 shows the vehicle 2 on the travel path 1, when the lane assist is activated. Reference is also made to FIG. 3, which shows a block diagram showing a relationship of the components of the lane assist system. The information about the activation of the lane assist is transmitted to the superimposed steering system of the vehicle 2. When the lane assist is activated, the lateral guidance of the vehicle 2 is predominantly assumed by the lane assist. Since the lane assist has been activated, the superimposed steering system, also known as dynamic steering, alters the translation ratio by a factor of 10, with the translation being reduced. This adjustment of the translation means that a steering wheel motion of +1° or −1° does not cause as heretofore a vehicle motion within a certain driving envelope (an area within the lane), instead now a steering wheel angle or a change in the steering wheel angle of +10° or −10° is required to trigger the same vehicle motion, when the lane assist is activated. As a result, the value of the steering angle signal increases in relation to interferences to thereby establish a good signal/noise ratio. The trajectory of the vehicle 2 can be determined in this embodiment ten times more precise and stable compared to the situation shown in FIG. 1.

In terms of driving dynamics, the change in the translation ratio is not critical because the vehicle is continuously guided by the activated lane assist within the specified area within the lane. The steering motions by the driver thus serve to predict a finely triggered trajectory inside the envelope.

FIG. 2 shows in accordance with the illustration of FIG. 1 a straight line 6 extending in longitudinal direction of the vehicle and corresponding to a steering angle of 0°. In addition, trajectories 6, 7 are shown to the left and right of the straight line 6 and correspond to the steering angle −10° and +10°. The area enclosed by the two trajectories 7, 8 is approximately equal to the area enclosed by the trajectories 4, 5 in FIG. 1. The reduction of the translation ratio of the superimposed steering system enables, however, a significantly more precise prediction about the future travel path.

To date, it has been simply assumed that the future course of a trajectory corresponds to the course of lane markings on the roadway. Any deviations caused by the driver from this course, e.g. as a result of cutting a curve, were only difficult to take into account because the signal of the current steering wheel angle as detected in a conventional manner had an inadequate signal/noise ratio. The reduction in the steering ratio now makes it possible to ascertain the trajectory, desired by the driver, in a precise and stable manner within the driving envelope as determined by the active lane assist. This trajectory course desired by the driver can be made available to various other functions. For example, the function "lateral-force free driving" requires determination of the future course of lateral acceleration based on the trajectory selected by the driver. A poor signal/noise ratio of the steering angle signal leads to a "fidgety" course of the lateral acceleration. Only by changing the translation ratio of the superimposed steering system does the steering wheel angle signal become useful for this function.

The change of the translation ratio is switched on when the lane assist is activated. When the lane assist is deactivated, the translation ratio is reset again to an initial value or to a normal level. Additional hardware components are not necessary.

The invention claimed is:

1. A lane assist system for a motor vehicle, said lane assist system configured for activation and deactivation and mechatronically connected to a superimposed steering system of the motor vehicle for enabling a steering intervention on an axle by the superimposed steering system, said lane assist system configured to reduce a translation ratio of the superimposed steering system, when activated, by a factor between 5 and 15.

2. The lane assist system of claim 1, wherein the translation ratio of the superimposed steering system, when activated, is reduced by the factor 10.

3. The lane assist system of claim 1, wherein the lane assist system is configured to increase, when deactivated, the translation ratio of the superimposed steering system to an initial value.

4. The lane assist system of claim 1, wherein a steering wheel angle is available as an input variable for prediction of a travel path of the motor vehicle.

5. A method for operating a lane assist system for a motor vehicle, comprising:
   operably connecting the lane assist system to a superimposed steering system of the vehicle; and
   activating the lane assist system to enable a steering intervention on an axle using the superimposed steering system such as to reduce a translation ratio of the superimposed steering system by a factor between 5 and 15.

6. The method of claim 5, wherein the translation ratio of the superimposed steering system is reduced approximately by the factor 10.

7. The method of claim 5, further comprising deactivating the lane assist system to increase the translation ratio of the superimposed steering system to an initial value.

8. The method of claim 5, further comprising using a steering wheel angle as an input variable for prediction of a travel path of the motor vehicle.

\* \* \* \* \*